US008792407B2

(12) United States Patent
Hu et al.

(10) Patent No.: US 8,792,407 B2
(45) Date of Patent: Jul. 29, 2014

(54) WIRELESS COMMUNICATION DEVICE POWER REDUCTION METHOD AND APPARATUS

(75) Inventors: Jun Hu, San Diego, CA (US); Donna Ghosh, San Diego, CA (US); Christopher G. Lott, San Deigo, CA (US); Rashid A. Attar, San Diego, CA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 144 days.

(21) Appl. No.: 13/401,122

(22) Filed: Feb. 21, 2012

(65) Prior Publication Data
US 2013/0215812 A1 Aug. 22, 2013

(51) Int. Cl.
*H04W 52/02* (2009.01)
*H04W 52/14* (2009.01)
*H04W 52/32* (2009.01)

(52) U.S. Cl.
CPC .......... *H04W 52/146* (2013.01); *H04W 52/325* (2013.01); *H04W 52/0209* (2013.01)
USPC ........... 370/312; 370/311; 370/318; 370/338; 455/435.2

(58) Field of Classification Search
CPC . H04W 52/02; H04W 52/04; H04W 52/0209; H04W 52/0219; H04W 52/146–52/327
USPC ................. 370/236, 311–338, 255; 455/343.1–343.5, 435.2
See application file for complete search history.

(56) References Cited

U.S. PATENT DOCUMENTS

| 6,377,790 | B1 | 4/2002 | Ishii |
| 6,545,989 | B1 * | 4/2003 | Butler ........................... 370/329 |
| 7,916,675 | B2 | 3/2011 | Dalsgaard et al. |
| 7,941,626 | B2 | 5/2011 | Marinier et al. |
| 8,094,595 | B2 | 1/2012 | Montojo et al. |
| 8,098,635 | B2 | 1/2012 | Montojo et al. |
| 8,254,977 | B2 | 8/2012 | Fernandez-Corbaton et al. |

(Continued)

FOREIGN PATENT DOCUMENTS

| AU | 2004202732 A1 | 7/2004 |
| EP | 1932380 A2 | 6/2008 |

(Continued)

OTHER PUBLICATIONS

International Search Report and Written Opinion—PCT/US2013/022222—ISA/EPO—Apr. 26, 2013.

(Continued)

*Primary Examiner* — Afsar M Qureshi
(74) *Attorney, Agent, or Firm* — S. Hossain Beladi (57) ABSTRACT

A wireless communications power saving method and apparatus is provided. The method includes, when no reverse link traffic exists and no forward link traffic has been received for a predetermined amount of time, establishing, at a terminal, a reverse link transmission pilot signal duty cycle, and boosting overhead channel signal transmission power during ON slots and gating overhead channel and pilot signal transmission power during OFF slots. The design further includes estimating, at the terminal, an available data transmission rate, determining an actual data transmission rate, setting a terminal transmission duty cycle for a next period based on the estimated available data transmission rate, the actual data transmission rate, and a margin of error, and transmitting data from the terminal according to the terminal transmission duty cycle.

20 Claims, 5 Drawing Sheets

(56) References Cited

U.S. PATENT DOCUMENTS

| | | |
|---|---|---|
| 2004/0017792 A1 | 1/2004 | Khaleghi et al. |
| 2005/0237984 A1 | 10/2005 | Benveniste |
| 2006/0105717 A1* | 5/2006 | Kwon et al. ............... 455/63.1 |
| 2006/0205396 A1* | 9/2006 | Laroia et al. ............. 455/422.1 |
| 2007/0195723 A1* | 8/2007 | Attar et al. ................. 370/318 |
| 2007/0263655 A1* | 11/2007 | Esteves et al. ............. 370/460 |
| 2009/0092069 A1* | 4/2009 | Rhee ........................... 370/311 |
| 2009/0180414 A1 | 7/2009 | Maeda et al. |
| 2009/0312060 A1 | 12/2009 | Bloebaum et al. |
| 2010/0202393 A1 | 8/2010 | Zhang et al. |
| 2010/0208639 A1 | 8/2010 | Jou et al. |
| 2010/0214942 A1 | 8/2010 | Du et al. |
| 2010/0323683 A1 | 12/2010 | Kazmi et al. |
| 2011/0044221 A1 | 2/2011 | Proctor, Jr. |
| 2011/0069649 A1 | 3/2011 | Gobriel et al. |
| 2011/0072285 A1 | 3/2011 | Fischer et al. |
| 2011/0103301 A1 | 5/2011 | Mueck et al. |
| 2011/0116427 A1 | 5/2011 | Chang et al. |
| 2011/0158142 A1 | 6/2011 | Gong et al. |
| 2011/0170420 A1 | 7/2011 | Xi et al. |
| 2012/0026939 A1* | 2/2012 | Sindhushayana et al. .... 370/328 |
| 2012/0082079 A1 | 4/2012 | Luo et al. |
| 2013/0028092 A1* | 1/2013 | Tong et al. .................. 370/236 |
| 2013/0107774 A1* | 5/2013 | Wang et al. ................. 370/311 |
| 2013/0121172 A1* | 5/2013 | Cheng et al. ................ 370/252 |
| 2013/0190027 A1* | 7/2013 | Cao et al. .................... 455/509 |
| 2013/0215788 A1 | 8/2013 | He et al. |
| 2013/0250832 A1 | 9/2013 | Kim et al. |

FOREIGN PATENT DOCUMENTS

| | | | |
|---|---|---|---|
| EP | 2320692 A1 | 5/2011 | |
| EP | 2398285 A1 | 12/2011 | |
| GB | 2493713 | * 2/2013 | ............ H04W 52/02 |
| GB | 2493713 A | 2/2013 | |
| WO | 2007025138 A2 | 3/2007 | |
| WO | 2007148198 A2 | 12/2007 | |

OTHER PUBLICATIONS

Partial International Search Report—PCT/US2013/022222—ISA/EPO—Mar. 14, 2013.

* cited by examiner

WIRELESS COMMUNICATION DEVICE POWER REDUCTION METHOD AND APPARATUS

BACKGROUND

I. Field

The present invention relates generally to telecommunications, and, more specifically, to power savings in wireless devices employed in wireless communication systems and cellular communication systems.

II. Background

A modem communication system provides data transmission for a variety of applications, including voice and data applications. In point-to-multipoint communications, modem communication systems have been based on frequency division multiple access (FDMA), time division multiple access (TDMA), code division multiple access (CDMA), and other multiple access communication schemes.

A CDMA communications system is typically designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station" (the "IS-98 standard"), (3) the standard sponsored by a consortium named "3rd Generation Partnership Project" (3GPP) and embodied in a set of documents known as the "W-CDMA standard," (4) the standard sponsored by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "TIA/EIA/IS-856 cdma2000 High Rate Packet Data Air Interface Specification" (the "cdma2000 standard" collectively), (5) the 1xEV-DO standard, and (6) certain other applicable standards. The standards expressly listed above are incorporated by reference as if fully set forth herein, including annexes, appendices, and other attachments.

Evolution-Data Optimized (EV-DO) is a wireless telecommunications standard used for transmission of data for broadband Internet access. EV-DO uses code division multiple access, or CDMA, as well as time division multiplexing, or TDM, to maximize individual user throughput and overall system throughput. EV-DO represents an evolution of the CDMA (IS-2000) standard supporting increased data rates and are optimized for data transmission. EV-DO is typically deployed together with voice services. In such a system, voice may be transmitted as data, for example, in voice over internet protocol (VoIP) transmissions.

The aforementioned 1xEV-DO includes Revision 0, Revision A, and Revision B, each of which provide benefits over previous versions of EV-DO. Capacity and quality of service (QoS), for example, are improved in 1xEV-DO Revision A. Revision B allows multi-carrier device operation.

Generally, a base station (in all versions of EV-DO, called an AN, or Access Network) provides data on the downlink to a user's access terminal (AT). The transmission of large quantities of data from the AN to an AT can sometimes result in the AT remaining fully powered for extended periods of time due to the bursty nature of the transmission and uncertainty as to whether all data has been received from the upstream devices. Such devices do not efficiently use power, and as a result power can rapidly drain from the device.

In wireless DO networks, an AT may be in a traffic state/mode or in a dormant state/mode. In the traffic state, the DO network allocates air link resources for communication between the AT and the AN at the AN. In the dormant state, the traffic channel is torn down, and air link resources are powered off at the AT. Power required to operate these resources is consequently conserved during the dormant state, thus extending battery life at the AT. Other subsystems of the AT may also be powered off or put into a "power save" mode for most of the time during the dormant state. The AT then occasionally "wakes up" to listen to the paging channel of the wireless system in order to respond to incoming pages or communication requests received from the AN. The duty cycle of such periodic paging channel checks is low to reduce the stand-by power consumption.

For a given battery capacity, the rate and amount of power consumption determines the amount of AT operation that may occur without recharging. Another way of looking at power consumption is that for a given AT operating time between battery recharges, average power consumption dictates the required battery capacity and, consequently, the size, weight, and cost of the battery. Reducing power consumption of an AT results in lower battery requirements and can save costs.

The present EV-DO specification limits what can be done with respect to AN operation and conserving power. EV-DO AN transmissions must occur in a certain predetermined manner, and thus techniques such as sending special power saving indications from the AN to the AT or transmitting data from the AN only at certain times or under certain conditions are generally unavailable.

Therefore, there is a need for methods and apparatus that would reduce power consumption of ATs. There is also a need for methods and apparatus that would reduce power consumption of ATs without excessively compromising performance characteristics of the access terminals and of the radio networks with which the terminals communicate. There is a further need for effectively and efficiently operating in in-place or previously-deployed networks while simultaneously providing reduced AT power consumption, and minimizing or eliminating required hardware changes to the radio network.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided for saving power in a terminal operating in a wireless communications system without the need to alter access node hardware or software. The method includes establishing, when no reverse link traffic exists, a duty cycle for reverse link transmission pilot and overhead signals, the duty cycle including a plurality of ON slots and a plurality of OFF slots, and boosting pilot signal transmission power during ON slots and gating pilot transmission signals during OFF slots. The design further includes estimating, at the terminal, an available data transmission rate for transmission from an access node to the terminal, determining an actual data transmission rate for transmission from the access node to the terminal, setting a terminal transmission duty cycle for a next period based on the estimated available data transmission rate, the actual data transmission rate, and a margin of error, and transmitting data from the terminal to the access node according to the terminal transmission duty cycle. The design further includes turning on and off where the duty cycle is based on the duration of data inactivity on the uplink and the downlink, i.e. when no data activity has occurred for a period of time. In this situation, the terminal begins gating the pilot and overhead signals on the uplink.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make or use the invention, and not to limit the scope of legal protection afforded the invention, which is defined by the claims and their equivalents.

The word "traffic" generally refers to payload or user traffic, such as data other than air interface control and pilots.

An access terminal, also referred to as AT, subscriber station, user equipment, UE, mobile terminal, or MT, may be mobile or stationary, and may communicate with one or more base transceiver stations. An access terminal may be any of a number of types of devices, including but not limited to PC card, external or internal modem, wireless telephone, smartphone, and personal digital assistant (PDA) with wireless communication capability. An access terminal transmits and receives data packets to or from a radio network controller through one or more base transceiver stations.

Base transceiver stations and base station controllers are parts of a network called radio network, RN, access network, and AN. A radio network may be a UTRAN or UMTS Terrestrial Radio Access Network. The radio network may transport data packets between multiple access terminals. The radio network may be further connected to additional networks outside the radio network, such as a corporate intranet, the Internet, a conventional public switched telephone network (PSTN), or another radio network, and may transport data and voice packets between each access terminal and such outside networks. Depending on conventions and on the specific implementation variants, a base transceiver station may be referred to by other names, such as Node-B, base station system (BSS), or simply base station. Similarly, a base station controller may be referred to by other names, such as radio network controller, RNC, controller, mobile switching center, or serving GPRS support node.

The scope of the invention extends to these and similar wireless communication system components.

Figure 1:
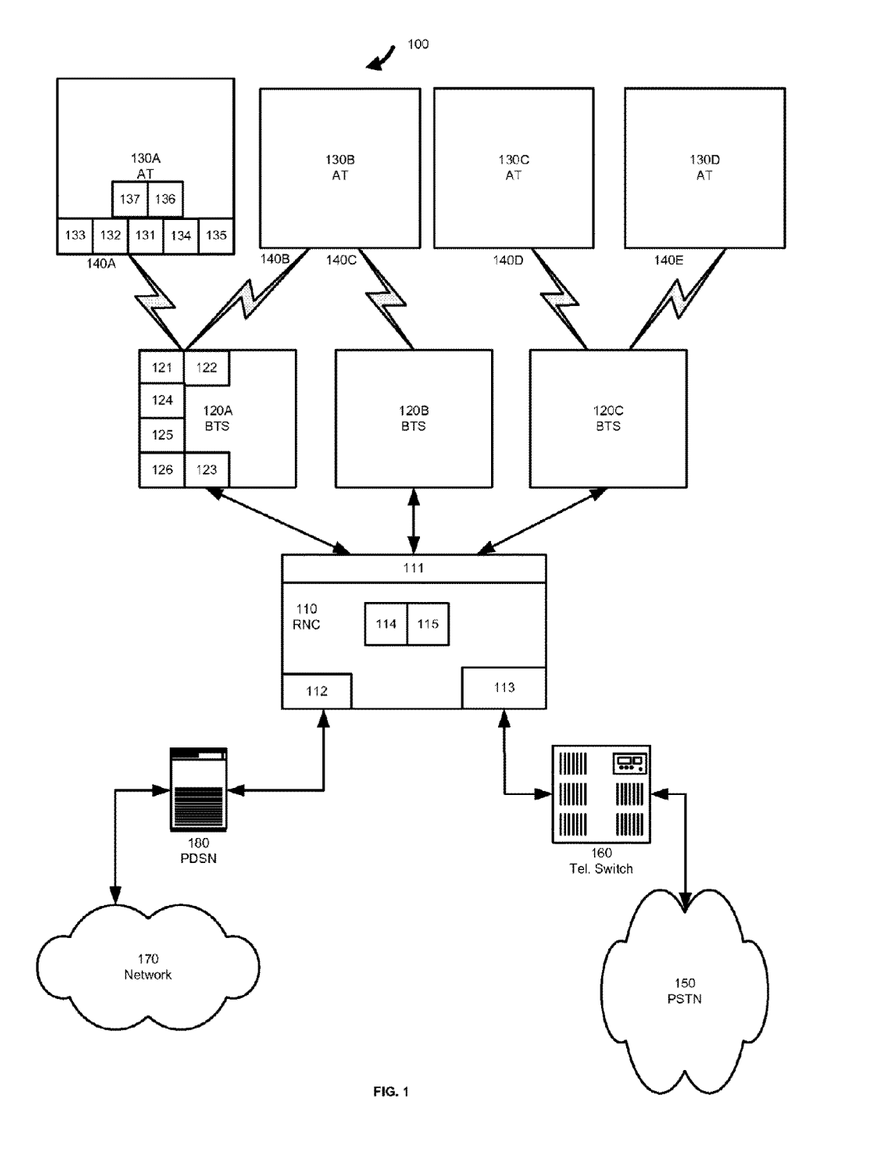
FIG. 1 is a high level block diagram of a system that employs power saving in a terminal used in wireless communications.

FIG. 1 illustrates selected components of a communication network 100, which includes a radio network controller 110 coupled to wireless base transceiver stations 120A, 120B, and 120C. The base transceiver stations 120 communicate with access terminals 130A, 130B, 130C, and 130D through corresponding wireless connections 140A through 140E. Each of the wireless connections 140 represents both a forward link (from the AN to the AT, also known as downlink) and a reverse link (from the AT to the AN, also known as uplink). The radio network controller 110 is coupled to a public switched telephone network 150 through a telephone switch 160, and to a packet switched network 170 through a packet data server node (PDSN) 180. Data interchange between various network elements, such as the radio network controller 110 and the packet data server node 180, can be implemented using any number of protocols, for example, the Internet Protocol (IP), an asynchronous transfer mode (ATM) protocol, T1, E1, frame relay, and other protocols.

The radio network controller 110 and the base transceiver stations 120 may be part of a data-optimized radio network, such as a 1xEV-DO network. In the illustrated embodiment, the radio network provides both data communication services and cellular telephone services to the access terminals 130. In alternative embodiments, the radio network may provide only data services (including VoIP and similar packetized data-based voice communications), or only voice services.

Multiple or even all the access terminals 130 may be in the same cell or site, or each access terminal 130 may be in a separate cell or site.

A typical access terminal, for example, the access terminal 130A, includes receiver circuitry 131, transmitter circuitry 132, encoder 133, decoder 134, equalizer 135, processor 136, and memory device 137. The receiver, transmitter, encoder, decoder, and equalizer are configured by the processor executing program code stored in the memory device. Each access terminal 130 is configured to communicate data using at least one transmission protocol, such as the wireless packet transmission protocols described in the specifications mentioned above. The access terminals 130 communicate with the base transceiver stations 120 via communication channels 140A through 140E, as shown in FIG. 1.

Each of the base transceiver stations 120 includes one or more wireless receivers (e.g., receiver 121 of the AN 120A), one or more wireless transmitters (e.g., transmitter 122 of the AN), radio network controller interface (e.g., interface 123), a memory (e.g. memory 124), a processor (e.g. processor 125), and encoder/decoder circuitry (e.g., encoder/decoder circuitry 126). A receiver/transmitter pair and other components of each base transceiver station are configured by the station's processor operating under control of the program code stored in the AN's memory, to establish forward and reverse links with the access terminals 130 in order to send packets to and receive packets from the access terminals 130. In the case of data services, for example, the base transceiver stations 120 may receive forward link data packets from the packet switched network 170 through the packet data server node 180 and through the radio network controller 110, and transmit these packets to the access terminals 130. The base transceiver stations 120 may receive reverse link data packets that originate at the access terminals 130, and forward these packets to the packet switched network 170 through the radio network controller 110 and the packet data server node 180. In the case of telephone (voice) services, the base transceiver stations 120 may receive forward link data packets from the telephone network 150 through the telephone switch 160 and through the radio network controller 110, and transmit these packets to the access terminals 130. Voice packets originating at the access terminals 130 may be received at the base transceiver stations 120 and forwarded to the telephone network 150 via the radio network controller 110 and the telephone switch 160.

In some alternative embodiments, the transmitter, receiver, and other components of each AN may each have separate processors.

The radio network controller 110 includes one or more interfaces 111 to the base transceiver stations 120, an interface 112 to the packet data server node 180, and an interface 113 to the telephone switch 160. The interfaces 111, 112, and 113 operate under control of one or more processors 114 executing program code stored in one or more memory devices 115.

The network 100 illustrated in FIG. 1 includes one public switched telephone network, one packet switched network, one base station controller, three base transceiver stations, and four access terminals. A person skilled in the art would recognize that alternative embodiments in accordance with aspects of the invention need not be limited to any particular number of these components. For example, a lesser or a greater number of base transceiver stations and access terminals may be included in some embodiments. Furthermore, the communication network 100 may connect the access terminals 130 to one or more additional communication networks, for example, a second wireless communication network having a number of wireless access terminals.

As noted, a known access terminal configured for communication may be in a dormant or traffic state, depending on the status of the network traffic between such known access terminal and the radio network. The traffic state corresponds to traffic activity between the radio network and the access terminal. For example, an access terminal may transition from dormant to traffic state in response to a voice call or data communication. The voice call or the data communication may be incoming (to the access terminal) or outgoing (from the access terminal). Conversely, the access terminal may transition from the traffic state to the dormant state when traffic activity ceases for some predetermined period of time. Typically, the radio network controls the transitions between the two states.

Traffic activity may be quite asymmetrical between the radio network and the access terminal. In other words, considerably more traffic may be communicated in one direction than in the opposite direction. This is particularly so for data communication, when downlink traffic flow typically exceeds uplink traffic flow by a large margin. For example, a user at an access terminal may be downloading a large file for a relatively long period of time, with mostly control information being communicated uplink. The control information may be from various layers, for example, Internet Protocol (IP) acknowledgements, and power control, rate control, and pilot of the physical air link. Another example of asymmetrical traffic is internet browsing where a gap occurs between user clicks and gaps between objects downloaded in one page originating from a single web page click. Similarly, internet audio/radio and video streaming encounter periods of inactivity while data is downloading. During such time periods, uplink resources of the access terminal continue to be powered on and consequently consuming power, although they are not needed to carry user (payload) data from the access terminal to the radio network.

In an embodiment, an access terminal 130 (e.g. the access terminal 130A) communicates with a base transceiver station (e.g., AN 120A) of a radio network. The radio network may be, for example, a data-optimized radio network such as 1xEV-DO network, a data-only network, or a voice-only network. The access terminal is configured to be in one of three states while connected to the radio network: (1) traffic state, (2) dormant state, and (3) active hold (AH) state. The first two states are similar or identical to the conventional traffic and dormant states of an access terminal, respectively. The active hold state is a transitional intermediate state between the dormant and traffic states. This state allows additional reduction in the power consumption of the access terminal, particularly during prolonged periods of reverse link traffic inactivity that coincide with forward link traffic activity of the access terminal.

In the active hold state, certain air link resources are used with a low duty cycle by the access terminal. For example, the AT power amplifier, filter banks and other transmit chain components may be powered down (off) on the reverse link side of the access terminal for a substantial percentage of the time. For example, the duty cycle of the transmit chain may be less than fifty percent, less than twenty-five percent, or less than five percent, where duty cycle in this context represents the ON/OFF ratio. In some variants, the AN does not deallocate, deassign, or power off channel elements and finger resources from serving the access terminal in the active hold state. Moreover, in some variants the radio network does not deallocate any resources from the AT in this state.

Device-Only DTX Transmission

The present design seeks to save power at the AT by the modem at the AT shutting down the reverse link transmit chain and the power amplifier under certain conditions. During active data transmission, natural gaps occur due to traffic source behavior. For example, one web page URL click may generate hundreds of bursty packets spread out in time, as well as gaps due to the AN being unable to schedule transmissions to a user due to sector loading. The present design enables the AT to turn off the reverse link transmit chain during these gaps in data transmissions. Such gaps occur on both uplink and downlink transmissions.

In most cases, the AT generates a small request on the uplink, such as a web click or request transmitted to an internet server, and the internet server responds with a relatively large amount of data on the downlink, and as a result most of the time the reverse link is not transmitting any data. In the present design, the AT turns off the reverse link for a significant portion of time, i.e. for as much time as possible. Such a design does not require any action or additional functionality on the part of the AN.

1xEV-DO frames are 26⅔ milliseconds long. Each 1xEV-DO frame is divided into sixteenths, called "slots." The AT transmits sub-packets occupying four reverse link slots, where the four reverse link slots are called a reverse link "subframe."

Figure 2:
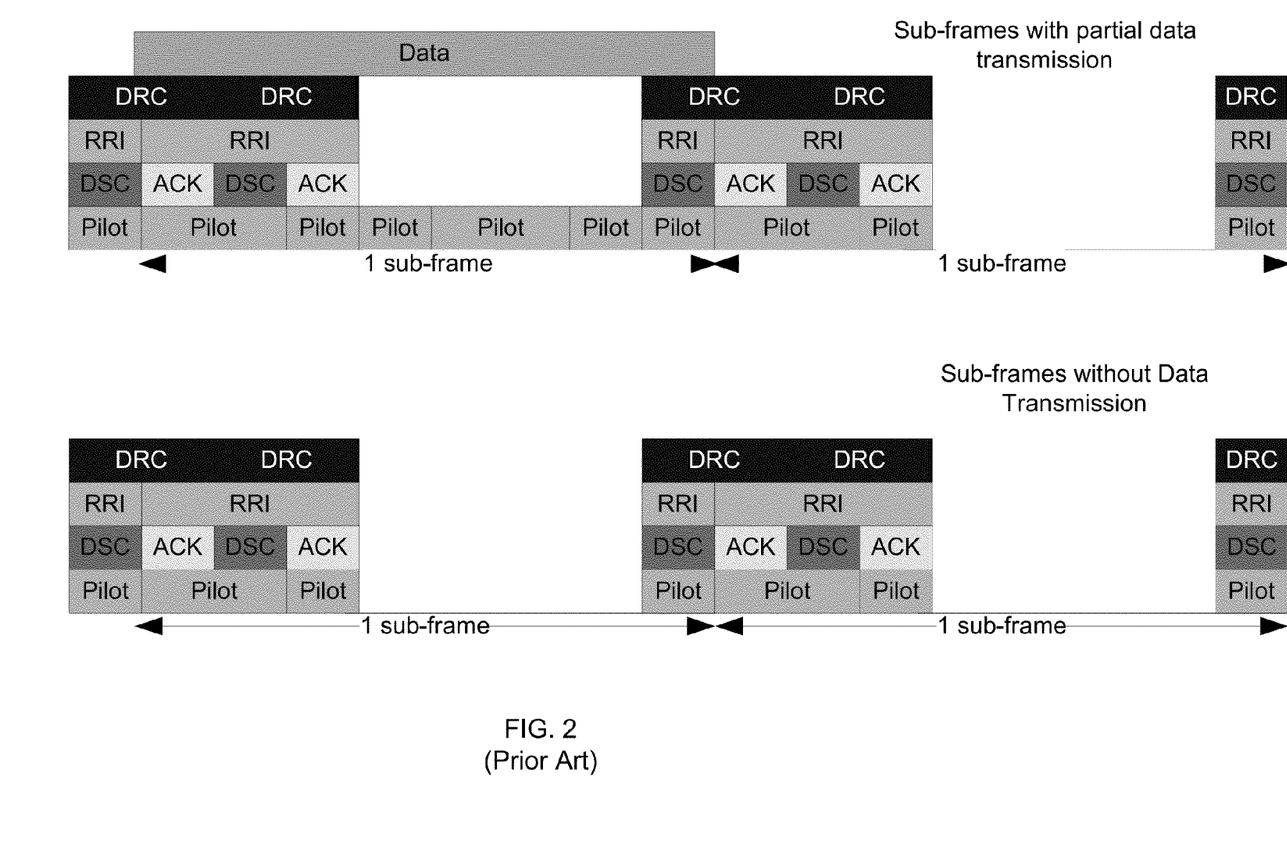
FIG. 2 illustrates previous discontinuous transfer (DTX) operation including subframes with partial data transmission and subframes without data transmission, requiring AN changes that are currently unavailable in the field.

FIG. 2 illustrates a previous discontinuous transfer (DTX) implementation including subframes with partial data transmission and subframes without data transmission. The design of FIG. 2 requires AN changes and these changes have not been implemented in the field. The present design takes into account AN and AT available operation including subframes, but does not require software or hardware changes at the AN.

Turning off the AT during times when data is not being transmitted can save power and does not require significant changes to the AN. During normal operation, the AT operates by transmitting for 2.5 slots and turning off for 1.5 slots when no data is available for transmission on the reverse link. In the present design, the AT turns off the transmit chain for a certain amount of time under predetermined conditions, thus saving power as compared with operation wherein slots are on and off for fixed periods of time irrespective of the presence of transmittable data. The operation shown in FIG. 2 illustrates a certain amount of down time, or non-transmission time, in the various subframes, and this down time is employed in the present design to save power.

Synchronization to existing operation of the AT and AN is of particular concern. If data transmission occurs on an irregular basis, data may not be received and converted appropriately, may be corrupted in transmission, or additional power or time may be needed to transmit the data, with each condition undesirable.

In typical operation, if the AN configures the AT in DTX (discontinuous transfer) mode, or the base station transmits an indication to the access terminal to operate in DTX, standard DTX operation takes place between the AT and AN. If the AN does not configure the AT in DTX mode, standard power saving functionality may be employed. In this situation, the AT typically sets the duty cycle to a fixed on period and a fixed off period, such as two slots on and two slots off. In this example, with four reverse link slots being transmitted in each sub-frame, this results in half a sub-frame on and half a sub-frame off, and such operation repeats every frame when no data is available for transmission on the uplink and no data has been received on the downlink for a certain amount of time. If the AT receives data on the downlink or transmits data on the uplink, the AT transmits pilot and overhead channels on all slots, such as all four slots until all data reception and/or transmission is complete.

In the present design, the pilot signal increases during the ON slots as a result of closed loop power control. The AT may also boost overhead channel gains during the on slots. The AT decreases pilot signal and overhead channel gains during the OFF slots. Discontinuous transmissions can result in the pilot duty cycle occurring anywhere in the frame, posing transmission problems between the AT and the AN. In the present design, the AT may align the pilot duty cycle to a known frame offset position, such as a frame offset of zero or one, to provide consistency during transmission.

Figure 3:
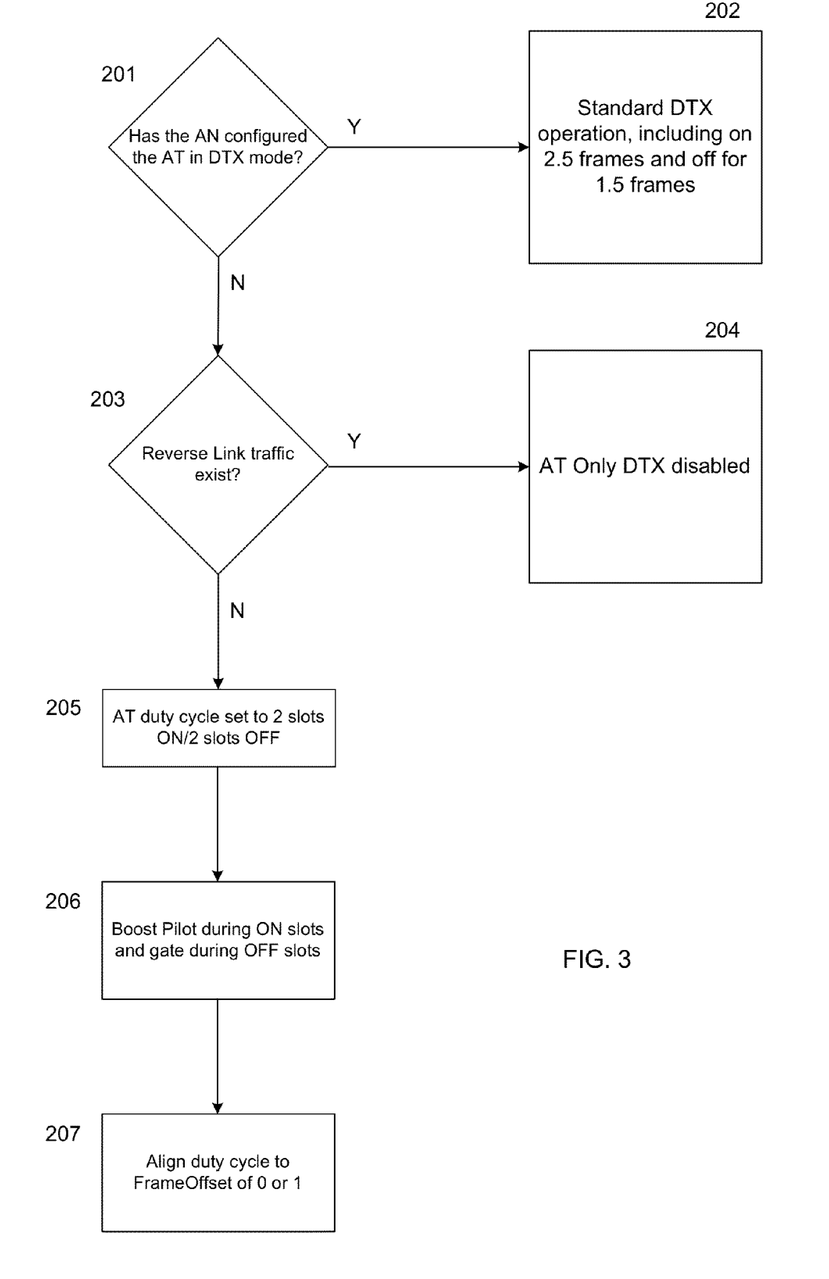
FIG. 3 illustrates general operation of one embodiment of the present design.
Figure 4:
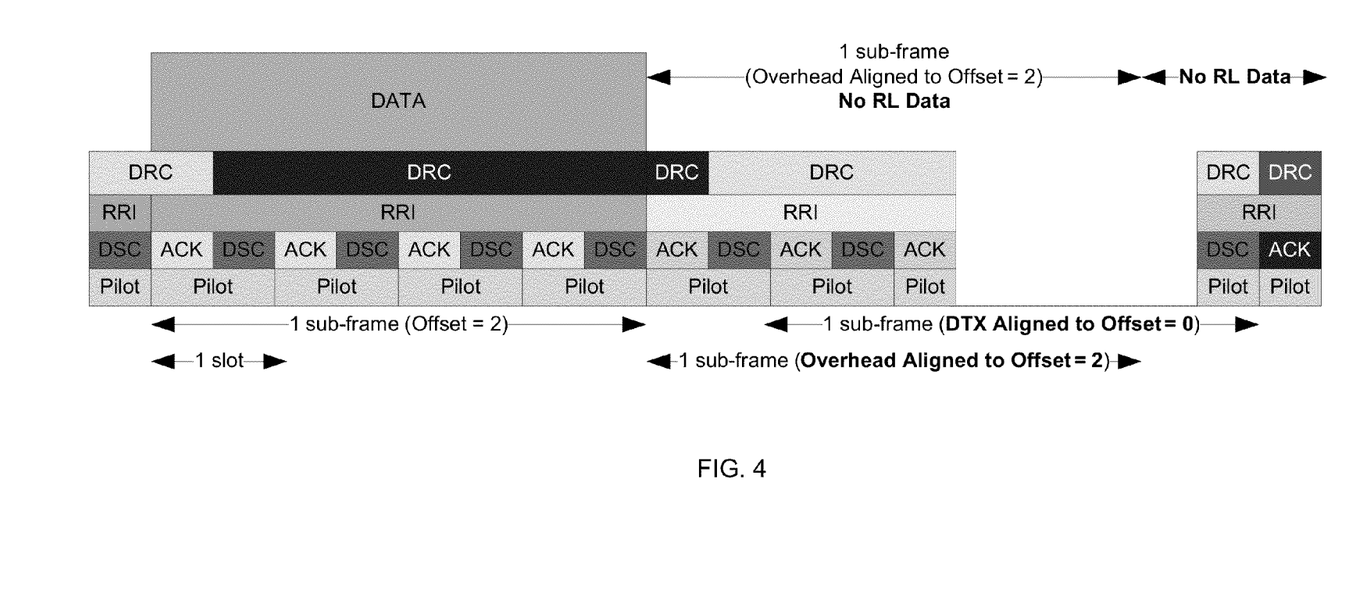
FIG. 4 shows an example of reverse link timing.

FIGS. 3 and 4 illustrate this device-only power saving design wherein the AT operates with two slots ON and two slots OFF when no data is present in the AT queue for uplink transmissions, and the AT receives no data from the AN for a predetermined amount of time. From FIG. 3, element 301 determines whether the AN has configured the AT in DTX mode. If so, element 302 shows that standard DTX operation occurs, namely an arrangement such as 2.5 slots on and 1.5 slots off. Element 303 evaluates whether traffic exists on the reverse link, and if so, element 304 disables AT-only DTX and again, 2.5 slots of on time and 1.5 slots of on time are transmitted. At point 305, the AT duty cycle is set to a different more power conserving duty cycle, such as two slots on and two slots off. Other timing configurations may be employed. Point 206 boosts the pilot transmit power during ON slots and gates the transmissions during OFF slots. Boosting the pilot transmit power is a result of closed loop power control requirements in EV-DO. Point 207 indicates the pilot duty cycle is aligned to a FrameOffset of zero or one to properly align with frame boundaries.

In one example, the AT turning pilot and overhead signals ON and OFF occurs at two different time scales, a short time scale with two slots on and two slots off for the design of the present embodiment, and a longer time scale with 64 slots on and 64 slots off in the embodiment described below. Other timings may be employed depending on circumstances. Turning the pilot and overhead channels ON and OFF using these two time scales occur simultaneously at the AT. Turning off the pilot and overhead channel transmissions on the uplink can incur penalties such as application layer delays. The AN does not receive information that the AT is operating in this manner to save power, and this operation appears to the AN to be an unreliable channel. Turning the pilot and overhead channels ON and OFF according to these two different time scales allows the AT to be conservative when conserving power. The AT can pick up the short term timescale gains without significant latency impact, and no data is available on both the uplink and downlink for some larger period of time, the AT may turn off for the longer time period.

When the AT turns off pilot and overhead signal transmissions, the AT turns off its power amplifier and effectively transmits nothing on the uplink.

Thus for the present embodiment, when no traffic is present on the reverse link and no data has been received from the AN for a predetermined amount of time, the AT is set to operate at a power conserving pilot duty cycle. In this manner, the AT conserves power during discontinuous transmissions without the need for AN changes.

Power Saving Using Adaptive On-Off Ratio

An alternative to saving power in an EV-DO communication system that again does not require AN operational modifications takes into account actual traffic patterns on both the forward link and the reverse link and seeks to utilize actual transmission characteristics in a manner intended to save power. The present embodiment seeks to turn off the power amplifier at the AT for longer durations. This embodiment provides an adaptive on/off ratio when the available airlink data rate is significantly larger than the data rate used by AT applications. The present embodiment appears, at the AN receiver, to operate in a manner similar to a deep fade. In this embodiment, alignment to known subframe locations is not required.

In operation, the present embodiment turns off for longer durations using the estimated available transmission rate and usage rate or, if no data has been received from the AN for a relatively long period of time, at the next DSC boundary, the AT turns off the power amplifier for a period of time, such as one DSC length. Once off, if new data arrives for transmission on the uplink, the AT turns on the power amplifier and transmits the uplink data. If the AT completes the uplink transmission before the next DSC boundary, the AT turns off the power amplifier until the next DSC boundary. If the AT has entered the next DSC boundary, the AT continues to transmit the pilot and overhead channels for the rest of the DSC length. If at the end of this sequence, still no data has been received from the AN, the AT turns off the power amplifier and the cycle repeats.

Forward link data rates are generally very bursty, with bursts of data transmissions occurring for a period of time, followed by long periods of zero or very low power transmissions. The present embodiment assesses actual performance in this bursty environment based on data transmission characteristics, and turns off reverse link transmission for a period of time, such as up to two slots out of four, in any sub-frame where no data transmission is occurring on the reverse link. This enables the discontinuous transmission (DTX) of pilot and overhead channels during sub-frames where no uplink data is present, i.e. the queue is empty.

The present design initially defines a period, such as ten DO frames, and a margin, such as 20 percent, where the margin is the amount of acceptable additional duty cycle "on" time. During each period, the AT estimates the available forward link transmission rate (R_est). This estimate may be based on different factors, including a fair allocation of forward link traffic for the device or a general class of devices, the number of other users in the sector (actual or estimated), and sector forward link slot utilization. Sector forward link slot utilization represents the amount of slot usage used on forward link transmissions. Also during each period, the AT measures the served forward link rate during the modem on or transmission period, R_meas_ON.

The AT then sets the duty cycle for the next period according to Equation (1):

$$\text{Duty Cycle} = (R\_meas\_ON/R\_est) + \text{Margin} \quad (1)$$

The period represents the maximum amount of time that the AT's transmit chain and power amplification can remain off and is a function of the air interface conditions. Parameters may be estimated, but actual measured quantities may be employed as available and desired.

As an alternative to the foregoing, Equation (1) may account for the available reverse link rate. For example, if the reverse link is transmitting little data, a higher duty cycle may be employed, and vice versa. Weighting factors may be employed. Other values less dependent on air interface may be employed, such as data traffic rates, device processing capability, and so forth.

In operation, the AT may employ two states, the FC_ON state (forward channel on) and the FC_OFF state (forward channel off). One implementation is a fixed duty cycle, having fixed ON and OFF times. A variable or adaptive duty cycle may also be provided, wherein the AT reduces the duty cycle when more data is present. In either the fixed or variable duty cycle case, two timers may be employed, an FC_ON_TIMER and an FC_OFF_TIMER. In the variable duty cycle situation, if no data is present, the maximum amount of time that the AT can remain off is bounded by the FC_OFF_TIMER and FC_ON_TIMER values. In other words, if more data is present, the duty cycle factor is reduced, while if no data is present, the maximum amount of time the AT can stay off depends on the FC_OFF_TIMER and FC_ON_TIMER values.

EV-DO provides a physical layer channel called the DSC (Data Source Control channel). On/off transmissions from the AT are preferably synchronized to the DSC. One DSC frame is equal to 64 DO slots, and in current deployment conditions for EV-DO, signal degradation may occur if the AT is turned off for more than one DSC frames, and thus the AT is not permitted to cease DSC transmission for more than one DSC frame. FIG. 4 illustrates representative timing for the present embodiment. The aforementioned FC_OFF_TIMER and FC_ON_TIMER values may have variable lengths measured in DSC lengths.

From FIG. 4, the first sub-frame, having offset of 2, includes data, DRC transmission, and Pilot data, among other data. The DRC length is four slots. In the second sub-frame, the discontinuous transmission (DTX) is aligned to offset of zero, while the overhead is aligned to offset of two. No data is transmitted over the second sub-frame. In this FIG. 4 example, the AT had no data queued for transmission after the first sub-frame. Hence the AT employs DTX by aligning overhead channels to subframe offset zero and turning off both the transmit chain and power amplification for the next two slots, and turns the transmit chain on for the following two slots. This on/off pattern with subframe offset zero continues until uplink data arrives in the transmission queue. When new uplink data is available at the AT, the AT transitions out of this DTX operation and transmits queued data normally until all data has been transmitted and the uplink queue is empty. Once the AT transmit queue is empty, the AT reinitiates the calculated DTX cycle.

The AT transitions from FC_ON to FC_OFF when no ongoing RL packet transmission is occurring and the queue length is zero (no transmission data in the queue). At the DSC boundary, the AT evaluates a specific previously occurring amount of time, such as x milliseconds. If no packet has been received during the x milliseconds, the AT turns off the transmit chain and power amplifier for an amount of time, such as the next x milliseconds or a particular DSC length. At the next DSC boundary after the transmit chain has been turned off, the AT turns on the transmit chain and power amplifier for at least one DSC length. In typical situations, the transmit ON time and transmit OFF time are identical, but different transmit ON and OFF times may be employed, and timing may be altered depending on circumstances. If intermittent data is received (i.e., data is received in less than x ms at the DSC boundary), the present embodiment of the design does not turn off the transmit chain and power amplifier.

The AT transitions from FC_OFF to FC_ON at the DSC boundary. When the AT is in the FC_OFF state and the RL queue becomes nonzero, the AT transitions to the FC_ON state and seeks to empty the RL queue. In this case, the AT may load the transmit chain with as much data as possible to empty the RL transmit queue. When all data has been transmitted and the reverse link queue is empty, the AT turns off the transmit chain if the AT is still in the FC_OFF state. Such timing and operation fits within current EV-DO parameters and no AN modifications.

Figure 5:
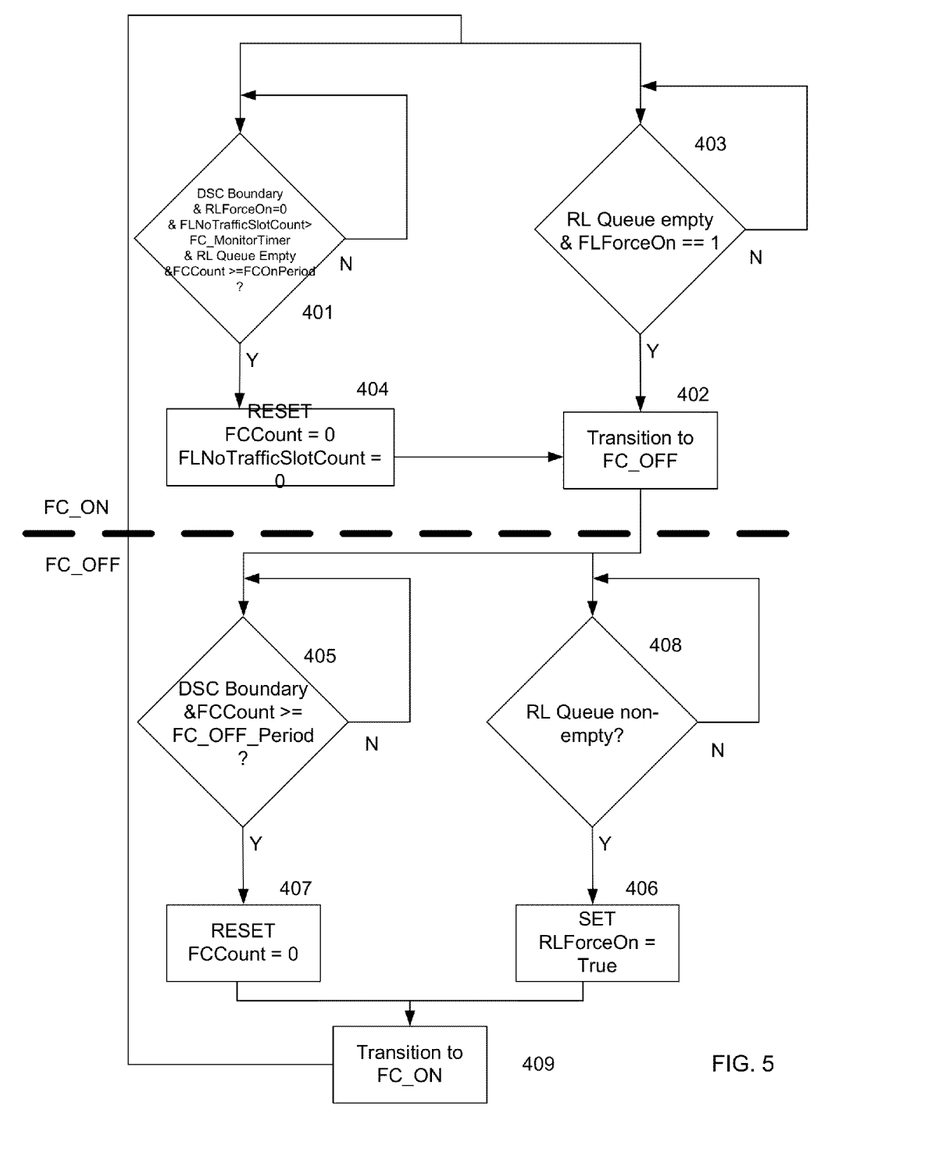
FIG. 5 illustrates the operation of a second embodiment of the present design employing a fixed duty cycle.

The present embodiment may operate as shown in FIG. 5, wherein FIG. 5 illustrates a fixed duty cycle. In this embodiment, the AT turns the power amplifier for a longer period of time than in the previous embodiment, such as for 64 slots ON and 64 slots OFF when no data exists in the AT queue for uplink transmissions and the AT has received no data from the AN for a second predetermined amount of time. In FIG. 5 the duty cycle is 50 percent (one DSC length on, one DSC length off) but the AT may employ any appropriate duty cycle. For example, for a 75 percent duty cycle, the AT may transmit at one-half DSC lengths on and one and a half DSC lengths off, with the DSC channel gain boosted during the on time.

In FIG. 5, operation is shown transitioning between FC_ON and FC_OFF as represented by the dotted line in the middle of the drawing. The top of the figure represents FC_ON being true, or in other words the AT operating according to the modified duty cycle discussed herein. At point 401, the system determines whether the AT is at the DSC boundary and the RLForceOn value is false. RLForceOn is a flag indicating that the AT has been forced to turn its transmitter on during an FC_OFF period because of the presence of RL traffic. Also, point 401 determines whether FLNoTrafficSlotCount is greater than the FC_Monitor_Timer, where FLNoTrafficSlotCount is a counter incremented every slot wherein no traffic exists. When the AT receives forward link traffic, the AT resets the FLNoTrafficSlotCount value to zero, thus containing the number of slots since the AT received no forward link traffic. Point 501 also requires the reverse link queue to be empty, and the FCCount to be greater than the FC_ON_Period, where the FC_ON_Period represents a predetermined allowable period for the AT to occupy the FC_ON state. FCCount is a counter incremented every slot, and counts the amount of time the AT has currently been in either the FC_ON or FC_OFF state.

If all of the conditions of point 501 exist, the AT transitions state at point 502 from FC_ON to FC_OFF, and as shown at point 404, FCCount is reset to zero, as is FLNoTrafficSLotCount. Alternately, state can change to FC_OFF as shown at point 403 if the reverse link queue is empty and FLForceOn is true, i.e. the AT has been forced to receive because of forward link traffic. This also results in state transition at point 502. Point 505 illustrates conditions that when satisfied causes the AT to transition from the FC_OFF state to the FC_ON state. The required conditions for point 505 are being at the DSC boundary and the FCCount being greater than or equal to the FC_OFF period. If both of these are true, the state transitions at point 506 from FC_OFF to FC_ON, and at point 507 FCCount is reset to zero. Alternately, state may transition if the reverse link queue is not empty as shown at point 508. Point 509 indicates RLForceOn is set to true, indicating a force condition has occurred, and FCCount is reset to zero, and point 506 indicates state transition occurs.

Using this state transition arrangement, a general minimal amount of time ON can occur, and the AT can successfully and efficiently transition between FC_ON and FC_OFF using specific timing and status checks.

Both embodiments described herein save AT power by turning off the power amplifier and transmit chain as much as possible during active data transmissions and while waiting for the dormancy timer at the AN to expire. Hence the present embodiment, during each period, the AT estimates the available forward link rate based on applicable factors, and sets the duty cycle based on the available forward link rate when the AT is not transmitting data.

Both embodiments may be employed together, or may be employed separately, or each may be employed in some instances but not in others.

It is noted that various aspects are described herein in connection with a terminal or access terminal (AT). A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for saving power in a wireless communication terminal, the method comprising:
   estimating, at the terminal, an available data transmission rate for transmission from an access node to the terminal;
   determining, at the terminal, an actual data transmission rate for transmission from the access node to the terminal;
   setting a terminal transmission duty cycle for a next period, wherein the terminal transmission duty cycle is calculated using the estimated available data transmission rate, the actual data transmission rate, and a margin of error; and
   transmitting data from the terminal to the access node according to the terminal transmission duty cycle.

2. The method of claim 1, wherein the estimated available transmission rate includes an allocation for the terminal, a number of users in a sector including the access node, and one from a group consisting of sector slot utilization from the access node to the terminal and an effective number of users in a sector where the access node is located.

3. The method of claim 1, wherein the access node transitions to a transmission off state when:
   no data is in a reverse link transmission queue for transmission from the terminal to the access node;
   no packet transmission occurs between the terminal and the access node; and
   no data source control channel (DSC) repointing is required.

4. The method of claim 3, wherein the terminal transitions to a transmission on state when:
   the terminal traverses a DSC boundary; and
   no transmission from terminal to access node has been received for a fixed amount of time.

5. The method of claim 1, wherein the terminal transmission duty cycle comprises an ON period that is equal to an OFF period.

6. A wireless communications terminal comprising:
   a processor configured to:
      estimate an available data transmission rate for transmission from an access node to the terminal;
      determine an actual data transmission rate for transmission from the access node to the terminal; and
      set a terminal transmission duty cycle for a next period, wherein the terminal transmission duty cycle is calculated using the estimated available data transmission rate, the actual data transmission rate, and a margin of error; and
   a transmitter configured to transmit data from the terminal to the access node according to the terminal transmission duty cycle.

7. The terminal of claim 6, wherein the estimated available transmission rate includes an allocation for the terminal, a number of users in a sector including the access node, and one from a group consisting of sector slot utilization from the access node to the terminal and an effective number of users in a sector where the access node is located.

8. The terminal of claim 6, wherein the terminal transitions to a transmission off state when:
   no data is in a reverse link transmission queue for transmission from the terminal to the access node;
   no packet transmission occurs between the terminal and the access node; and
   no data source control channel (DSC) repointing is required.

9. The terminal of claim 8, wherein the terminal transitions to a transmission on state when:
   the terminal traverses a DSC boundary; and
   no transmission from terminal to access node has been received for a fixed amount of time.

10. The terminal of claim 6, wherein the terminal transmission duty cycle comprises an ON period that is equal to an OFF period.

11. A wireless communications terminal comprising:
    means for estimating, at the terminal, an available data transmission rate for transmission from an access node to the terminal;
    means for determining, at the terminal, an actual data transmission rate for transmission from the access node to the terminal;
    means for setting a terminal transmission duty cycle for a next period, wherein the terminal transmission duty cycle is calculated using the estimated available data transmission rate, the actual data transmission rate, and a margin of error; and
    means for transmitting data from the terminal to the access node according to the terminal transmission duty cycle.

12. The terminal of claim 11, wherein the estimated available transmission rate includes an allocation for the terminal, a number of users in a sector including the access node, and one from a group consisting of sector slot utilization from the access node to the terminal and an effective number of users in a sector where the access node is located.

13. The terminal of claim 11, wherein the access node transitions to a transmission off state when:
    no data is in a reverse link transmission queue for transmission from the terminal to the access node;
    no packet transmission occurs between the terminal and the access node; and
    no data source control channel (DSC) repointing is required.

14. The terminal of claim 13, wherein the terminal transitions to a transmission on state when:
    the terminal traverses a DSC boundary; and
    no transmission from terminal to access node has been received for a fixed amount of time.

15. The terminal of claim 11, wherein the terminal transmission duty cycle comprises an ON period that is equal to an OFF period.

16. A non-transitory computer readable storage medium comprising instructions that, when executed by a processor, performs the following method:
    estimating, at the terminal, an available data transmission rate for transmission from an access node to the terminal;

determining, at the terminal, an actual data transmission rate for transmission from the access node to the terminal;

setting a terminal transmission duty cycle for a next period, wherein the terminal transmission duty cycle is calculated using the estimated available data transmission rate, the actual data transmission rate, and a margin of error; and transmitting data from the terminal to the access node according to the terminal transmission duty cycle.

17. The non-transitory computer readable storage medium of claim 16, wherein the estimated available transmission rate includes an allocation for the terminal, a number of users in a sector including the access node, and one from a group consisting of sector slot utilization from the access node to the terminal and an effective number of users in a sector where the access node is located.

18. The non-transitory computer readable storage medium of claim 16, wherein the access node transitions to a transmission off state when:
- no data is in a reverse link transmission queue for transmission from the terminal to the access node;
- no packet transmission occurs between the terminal and the access node; and
- no data source control channel (DSC) repointing is required.

19. The non-transitory computer readable storage medium of claim 18, wherein the terminal transitions to a transmission on state when:
- the terminal traverses a DSC boundary; and
- no transmission from terminal to access node has been received for a fixed amount of time.

20. The non-transitory computer readable storage medium of claim 16, wherein the terminal transmission duty cycle comprises an ON period that is equal to an OFF period.

\* \* \* \* \*